(12) United States Patent
Finkeldei et al.

(10) Patent No.: US 6,325,946 B1
(45) Date of Patent: Dec. 4, 2001

(54) PROCESS FOR TREATING WASTE WATER

(75) Inventors: Caspar-Heinrich Finkeldei, Aschaffenburg; Andrea Preuss, Hanau; Matthias Woyciechowski, Langenselbold; Steffen Hasenzahl, Maintal, all of (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 09/587,364

(22) Filed: Jun. 2, 2000

(51) Int. Cl.$^7$ .................................................. C02F 1/72
(52) U.S. Cl. ............................. 210/759; 210/763
(58) Field of Search ...................... 210/759, 763

(56) References Cited

U.S. PATENT DOCUMENTS

| | | | |
|---|---|---|---|
| 4,410,501 | 10/1983 | Taramasso et al. | 423/326 |
| 4,861,484 | * 8/1989 | Lichtin et al. | |
| 5,620,610 | * 4/1997 | Ishii et al. | |
| 6,132,627 | * 10/2000 | Joko et al. | |

FOREIGN PATENT DOCUMENTS

| | | |
|---|---|---|
| 31 35 559 | 6/1984 | (DE) . |
| 196 17 729 | 11/1997 | (DE) . |
| 199 25 534 | 7/2000 | (DE) . |
| 0100119 | 2/1984 | (EP) . |
| 0 208 311 | 1/1987 | (EP) . |
| 0257983 | 3/1988 | (EP) . |
| 0 376 453 | 7/1990 | (EP) . |

OTHER PUBLICATIONS

Abbau von Schadstoffen in Problem–wässern durch katalytische Oxidation, Jörg Hofmann, Heiko Tauchnitz und Heike Vanselow, pp. 399–401.

Heterogene Katalyse fü die Vorbehandlung von Abwassern, Nikolaus Gschwind.

Versuche zur hemmenden Wirkung der mikrobiellen Nitrifikation durch Test–substanzen un Testsubstanzgemische, Regina Walter, Ines Rensch, Markus Wegewitz, pp. 43 and 124.

Abwasser, Oxidativer Abbau von AOX und CSB in realen Abwässern: Vergleich verschiedener, "Advanced Oxidation Processes", pp. 85–85.

Mehrstufige Pilotanlage zur oxidativen Abwasserbehandlung nach dem Fenton–Verfahren ($H_2O_2$/Fe–Katalysator), Chemie Ingenieur Technik 9195, pp. 1089–1090.

* cited by examiner

*Primary Examiner*—Betsey Morrison Hoey
(74) *Attorney, Agent, or Firm*—Smith, Gambrell & Russell, LLP

(57) ABSTRACT

Waste waters are treated with hydroxyl producers in the presence of titanium-containing silicates as catalyst.

12 Claims, 5 Drawing Sheets

PROCESS FOR TREATING WASTE WATER

INTRODUCTION AND BACKGROUND OF THE INVENTION

The present invention relates to a process for treating waste water.

A wide variety of processes and combinations of processes are used for treating waste water such as, for example, chemico-physical methods such as precipitation and flocculation, or adsorptive processes, for example using active carbon, or the removal of harmful substances by biodegradation or oxidation of harmful substances by different methods.

The oxidative treatment of waste water with oxygen-containing gases, using titanium, silicon or zirconium-containing mixed catalysts at high temperatures and under pressure is known (EP 0 257 983 A).

In order to be able to perform waste water treatment under ambient conditions, compounds which form hydroxyl radicals, for example hydrogen peroxide, are used in many cases for the oxidation of harmful substances. Frequently, however, hydrogen peroxide alone is not reactive enough. It has to be activated in an appropriate manner.

UV light may be used, for example, for activation purposes. UV light causes amplified production of hydroxyl radicals from hydrogen peroxide. This hydroxyl radical production is also catalyzed by dissolved iron salts. The combination of hydrogen peroxide and dissolved iron(II) salts is called Fenton's reagent (O. Specht, I. Wurdack, D. Wabner "Mehrstufige Pilotanlage zur oxidativen Abwasserbehandlung nach dem Fenton-Verfahren ($H_2O_2$/Fe-Katalysator), Chemie Ingenieur Technik 9/1995).

However, the use of Fenton's reagent has serious disadvantages (I. Wurdack, C. Höfl, G. Sigl, O. Specht, D. Wabner "Oxidativer Abbau von AOX und CSB in realen Abwässern: Vergleich verschiedener "Advanced Oxidation Processes", 3rd GVC conference "Verfahrenstechnik der Abwasser- und Schlammbehandlung", VDI-Verlag 1996): The reaction proceeds only at a very acid pH values between 2 and 3. Thus, the waste water has to be initially acidified, and then neutralized again after oxidation with Fenton's reagent, before it can be passed into a sewage treatment plant or receiving waters. This results in considerable salting out of the waste water and the production of considerable amounts of a sparingly soluble iron hydroxide precipitate which has to be removed. In addition, there is a high, non-specific, consumption of $H_2O_2$ during this reaction.

It is accordingly an object of the invention was to get round the disadvantages of Fenton's reagent mentioned above. Salting out of the waste water should be avoided and the non-specific consumption of $H_2O_2$ should be restricted as far as possible.

SUMMARY OF THE INVENTION

The above and other objects of the invention can be achieved by a process for treating waste water which is characterized in that the waste water is treated with hydroxyl radical producers, such as for example hydrogen peroxide, in the presence of titanium-containing silicates as catalyst.

In one embodiment of the invention, metal silicates are used as catalyst.

Furthermore, a titanium-containing metal silicate selected from the group consisting of titanium silicalite TS1, titanium silicalite TS2, titanium-containing ZSM5, titanium-containing DAY, titanium-containing beta-zeolite and mixtures thereof may be used as catalyst.

Crystalline metal silicates with regular micropores or mesopores are sometimes very effective catalysts for the synthesis of various products. In particular, microporous products with the general composition represented by the formula $(SiO_2)1-x(TiO_2)x$, in which titanium atoms replace some of the silicon atoms in the crystal lattice, have gained industrial importance as oxidation catalysts. Here, titanium silicalite-1 (U.S. Pat. No. 4,410,501 incorporated herein by reference) and titanium silicalite-2 (J.S. Reddy, S. Sivasanker, P. Ratnasamy, J. Mol. Catal. 71 (1992) 373) may be mentioned in particular. Thus, for example, the reaction of olefins with hydrogen peroxide to give epoxides (EP 100 119), the reaction of aromatic compounds with hydrogen peroxide to give hydroxyaromatic compounds (DE 31 35 559), the reaction of aliphatic hydrocarbons with hydrogen peroxide to give alcohols and ketones (EP 376 453) and the reaction of cyclohexanone with hydrogen peroxide and ammonia to give cyclohexanone oxime (EP 208 311) are known.

According to the invention, microporous or mesoporous, titanium-containing metal silicates, in particular titanium silicalite-1, may be used as a catalyst in the presence of hydroxyl radical producers, e.g. hydrogen peroxide, for the oxidation of constituents of waste waters under mild reaction conditions, e.g. at neutral pH and room temperature.

BRIEF DESCRIPTION OF THE DRAWINGS

The present invention will be further understood with reference to the accompanying drawings, wherein.

DETAILED DESCRIPTION OF THE INVENTION

Figure 1:
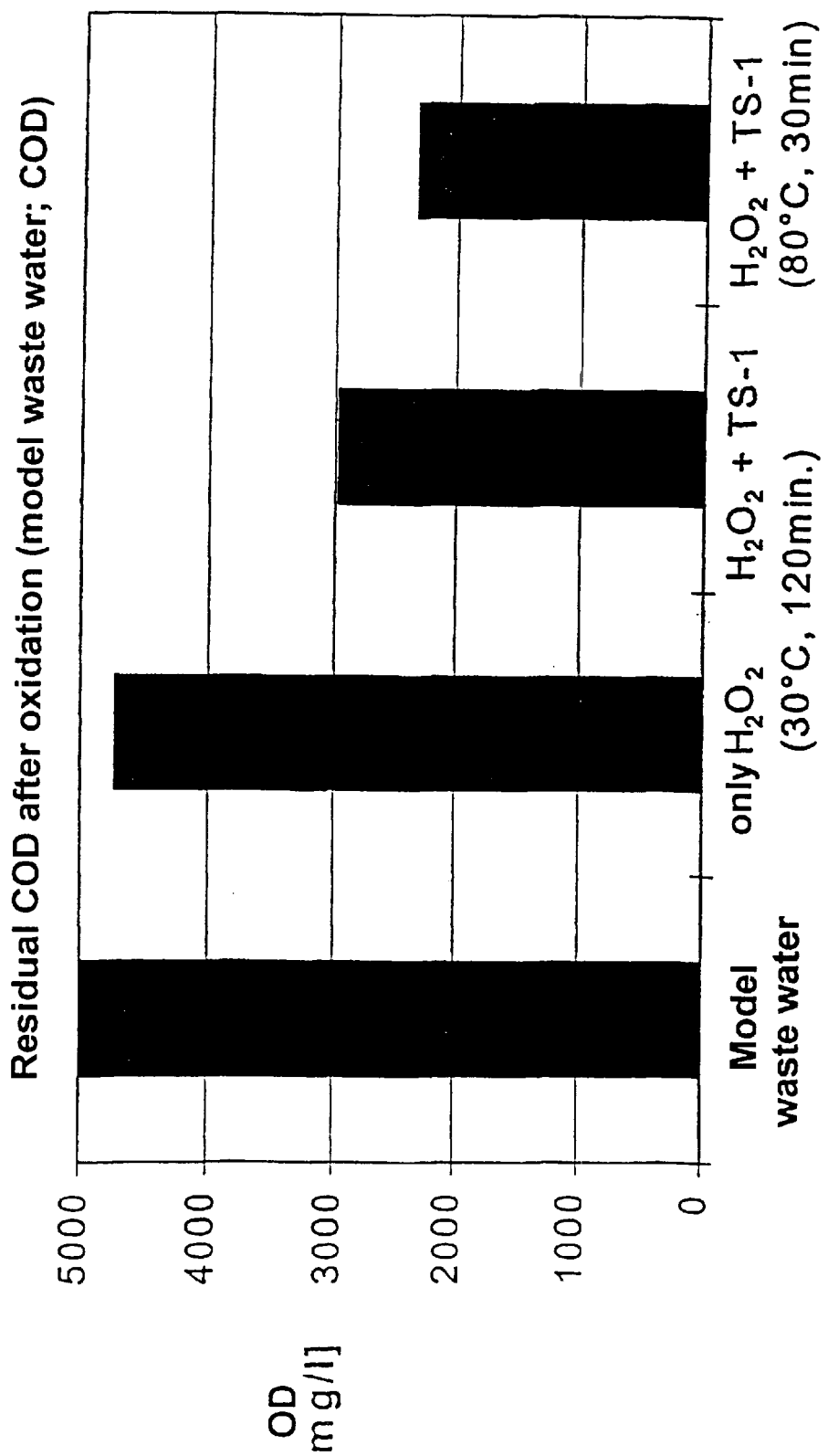
FIG. 1 is a graph showing chemical oxygen demand after oxidation.

The present invention will now be described in greater detail.

Waste waters which can be treated using the process in accordance with the invention are those which contain oxidizable organic or also inorganic compounds. The process is especially advantageous when the constituents of the waste water are not readily biodegradable. Thus, waste waters from the chemical and pharmaceuticals industries, waste waters from the metal processing and petroleum industries, ground waters which are contaminated with organic substances and waste waters from vent gas scrubbers can also be treated in addition to municipal sewage. The harmful substances which can be treated are primarily a variety of substituted aliphatic and aromatic organic compounds such as, for example, sulfur-containing organic substances with mercapto or sulfo functions, carboxylic acids and amides, amines, aliphatic hydrocarbons, mononuclear and polynuclear aromatic compounds, chlorinated aliphatic and aromatic compounds, aliphatic homocyclic and heterocyclic compounds.

Using the process according to the invention, partial oxidation of the harmful substances in waste waters may be achieved. The biodegradability of harmful substances may be increased by partial oxidation.

Since in many cases, in particular in the case of non-biodegradable waste waters, the harmful substances which are present are not fully known and also cannot be identified, additive parameters such as chemical oxygen demand (COD, determined according to DIN ISO 6060 or DIN 38409/41) or total organic carbon (TOC, according to EN 1484) are used to characterize waste waters. The process according to the invention therefore has as an objective in the first place a certain reduction in the COD or TOC present and also an improvement in biodegradability, as measured in standard tests according to DIN EN 29 888 (Zahn-Wellens process). As a result of partial oxidation of the harmful substances present, inhibition of nitrification may also be decreased or increased, this being determined by a standard Degussa method, SOP UT-001.

The concentrations of the constituents of waste waters may be in the range from a few mg COD/l to 100 g COD/l, mainly between 0.1 and 20 g COD/l.

The titanium-containing silicates used as catalysts maybe used in powdered form in concentrations between 0.05 and 100 g/l, preferably between 0.5 and 10 g/l, and/or as moulded items such as e.g. granules, extrudates or beads. Titanium silicalite-1 is particularly suitable as catalyst. The catalyst powder may contain between 1 and 5% (w/w) of titanium dioxide, preferably between 2 and 3%.

The reaction may be done under comparatively mild reaction conditions. The pH value is between 2 and 9, preferably between 6.0 and 8.0.

The process may proceed at a temperature between freezing point and boiling point, preferably in the temperature range between 15 and 40° C.

Catalysis may be performed in a suspension reactor with or without complete separation of the catalyst. The catalyst may be allowed to settle out after completion of the reaction, when small catalyst losses have to be accepted in the run-off for the treated waste water.

In another embodiment, the suspension reactor may be combined with crossflow filtration, wherein the suspension is allowed to flow past a porous area/membrane and a pressure difference is applied between the face being flowed over and the filtrate side so that some of the solution flows through the area/membrane at right angles to the direction of flow (patent application DE 196 17 729.4).

In another embodiment of the invention, titanium-containing silicates are used as moulded items in a fixed bed reactor, through which the waste water to be treated continuously flows in the presence of $H_2O_2$. The moulded items used may be, for example, 2 mm solid cylinders with 20% binder (e.g. silica sol).

EXAMPLES

1st Example 500 ml of a model waste water with 2.1 g/l of phenol are initially placed in a heated and stirred glass beaker, heated to the start temperature (see below, 30° C. or 80° C.) and then 6.25 g of titanium silicalite and 12.75 g of 50% strength $H_2O_2$ solution are added immediately after each other. The mixture without any catalyst is used as a blank sample. The pH of the model waste water is 7. The model waste water is not buffered. The residual COD is analyzed after different reaction times (<=120 min).

A clear reduction in the COD contained is achieved under very mild conditions with titanium silicalite, as compared to a blank sample with only $H_2O_2$. A corresponding oxidative reaction with the aid of iron salts as catalyst (Fenton's reagent) would require a strongly acidic pH. An increase in temperature to 80° C. causes a shortening of reaction time to less than one quarter.

During the course of reaction there is a decrease in pH, which indicates the production of organic acids due to oxidation.

The results for example 1 are shown graphically in FIG. 1.

2nd Example 500 ml of a model waste water with 2.4 g/l of ethanol are initially placed in a heated and stirred glass beaker, heated to 30° C. and then 6.25 g of titanium silicalite and 12.75 g of 50% strength $H_2O_2$ solution are added immediately after each other. The pH of the model waste water is 8.0. The model waste water is not buffered. The residual COD is analyzed after 120 min. For comparison, oxidation of the model harmful substance is performed in the same test system using Fenton's reagent at pH 2.5.

With Fenton's reagent, a reduction in COD by 54%, as compared with the starting concentration, was observed after 120 min. With titanium silicalite, under substantially milder conditions, a degree of degradation of 40% is achieved at pH 8. Thus, salting out of the water, which is unavoidable when using Fenton's reagent, is avoided.

Figure 2:
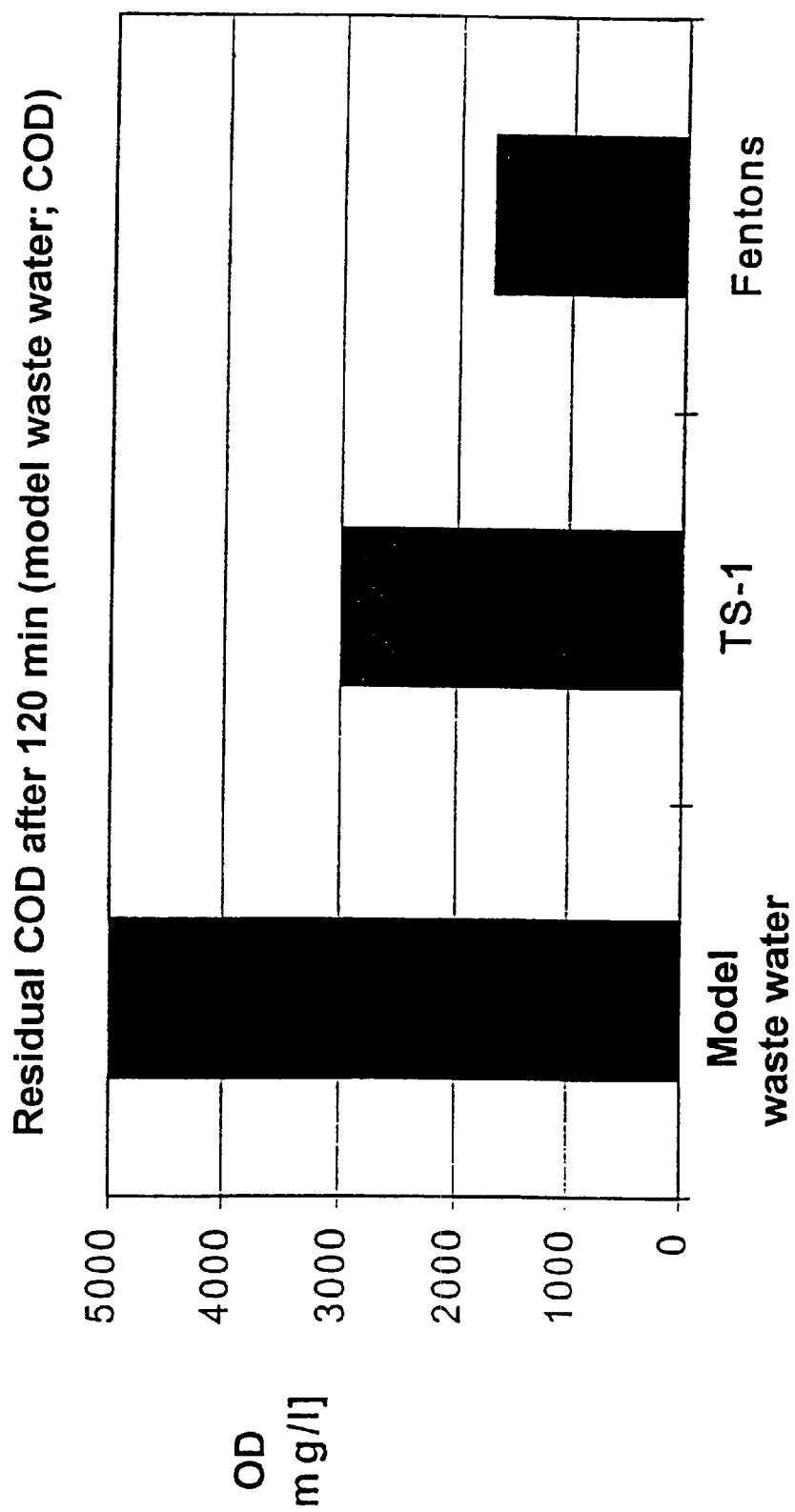
FIG. 2 is a graph showing chemical oxygen demand after 120 minutes.

The results for example 2 are shown graphically in FIG. 2.

3rd Example

A column with 100 ml of catalyst packing as moulded items (extruded solid cylinders of titanium silicalite, Ø2 mm, length 3 mm, with 20% silicon dioxide as binder, calcined for 1 h at 550° C.) is continuously supplied with a real waste water stream at 100 ml/h, adjusted to pH 6.0, to which had previously been added 5–10 ml of 30% strength $H_2O_2$ solution. About 80 to 100 ml/h from the column run-off is returned to the head in order to maintain catalyst wetting. The amount supplied (100 ml/h) is removed from the column run-off.

An increase of approximately a factor of 8 is observed in the COD values measured. This is possibly due to the fact that the constituents are oxidized or partly oxidized so that they are quantitatively accessed only during the subsequent COD measurement procedure. This is probably not the case in the original waste water. That is to say: the COD values measured in the original waste water are probably too low, which could explain the increase in COD values.

The toxicity towards a nitrifying biomass (nitrification inhibition) is quantitatively eliminated by the oxidative treatment according to the invention (proven in the nitrification test according to SOP UT-001). At the same time, the fundamental biodegradability is improved in the Zahn-Wellens test procedure.

Other treatment processes tested with this real waste water such as, for example, alkaline pressurized hydrolysis or oxidation with Fenton's reagent, show neither an increase in COD values measured nor a significant reduction in toxicity with regard to the nitrification properties of biomasses.

Figure 3:
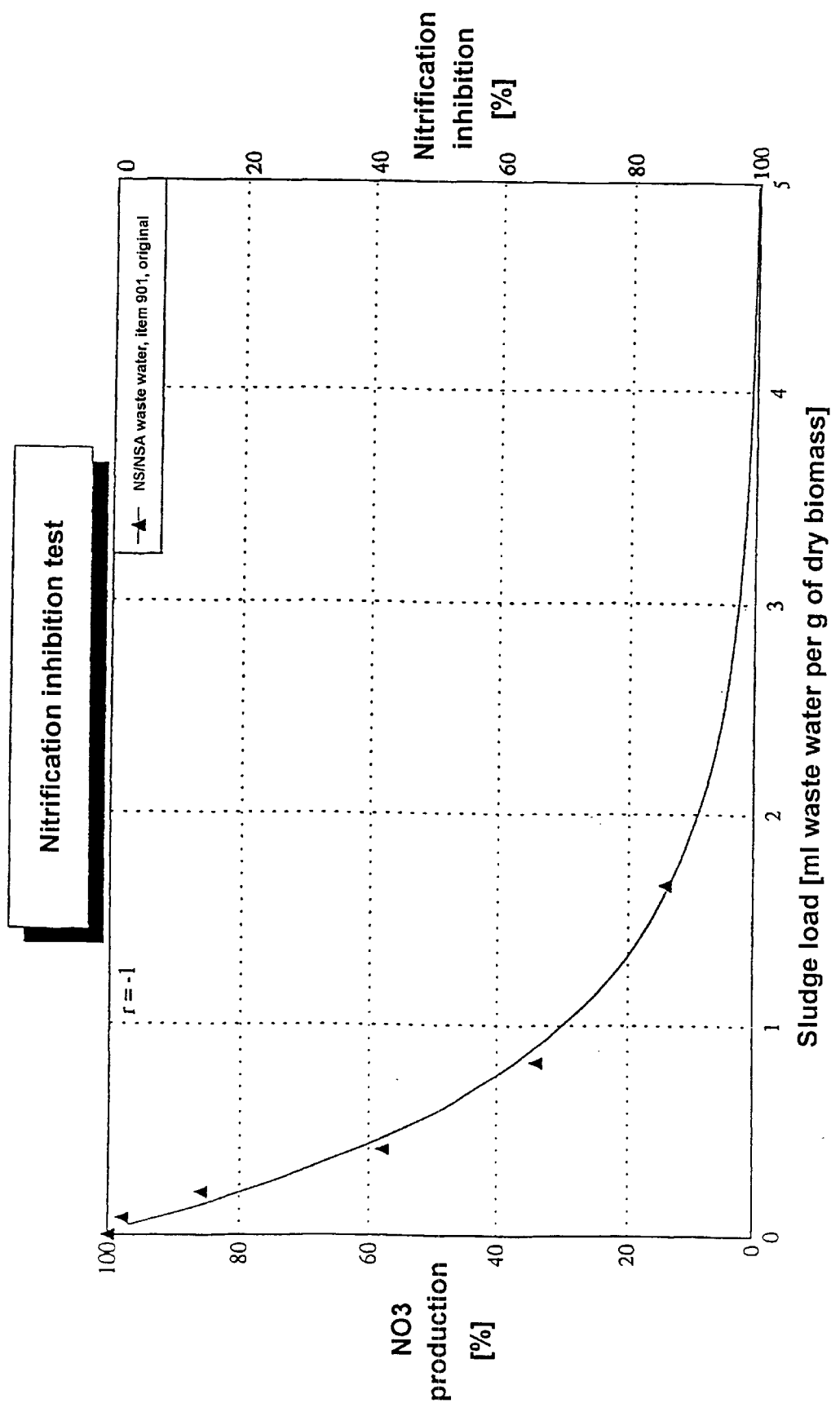
FIG. 3 is a graph showing nitrification inhibition test with NS/NSA waste water, item 901, original.
Figure 4:
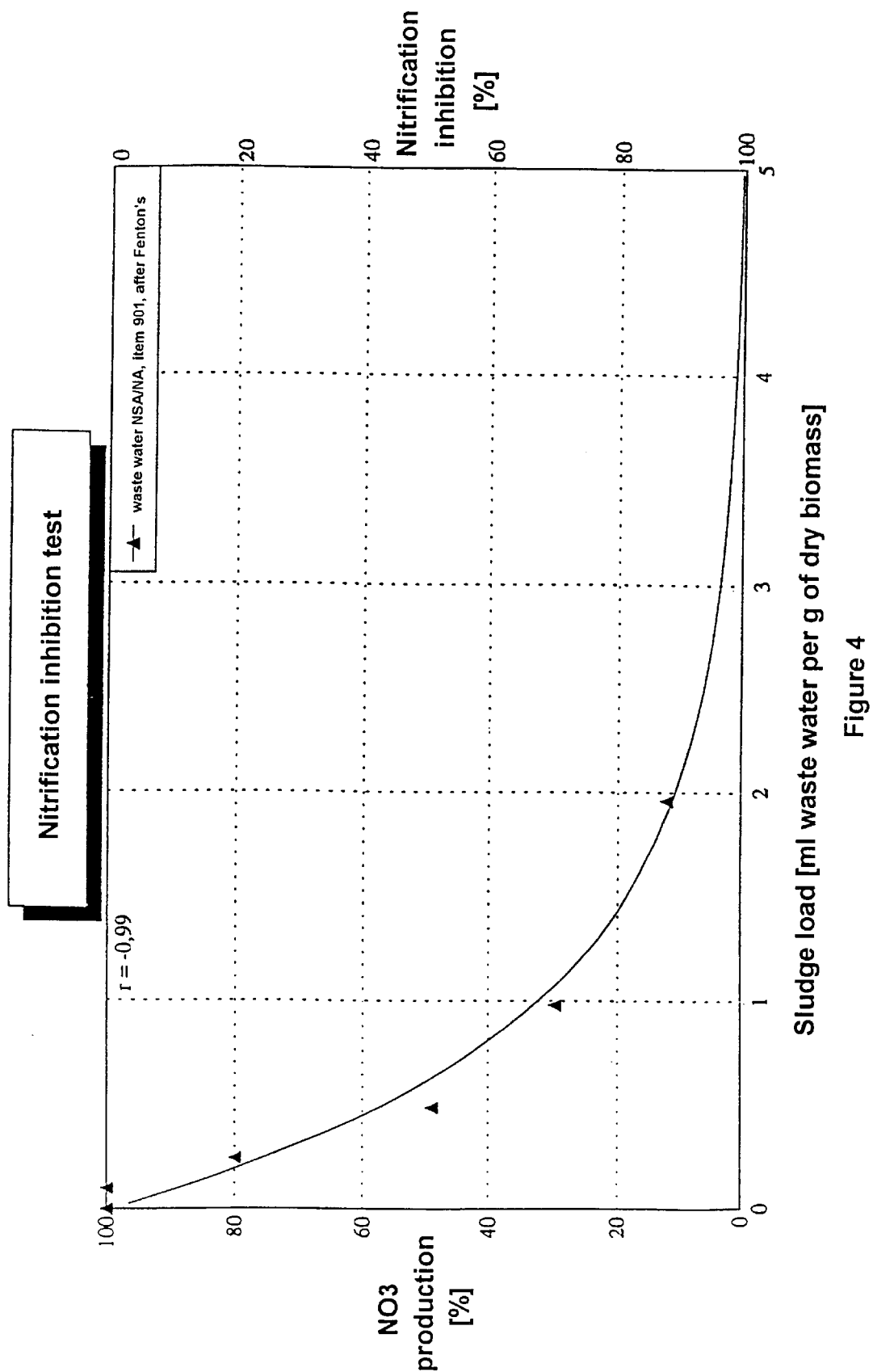
FIG. 4 is a graph showing nitrification inhibition test with NS/NSA waste water, item 901, after Fenton's.
Figure 5:
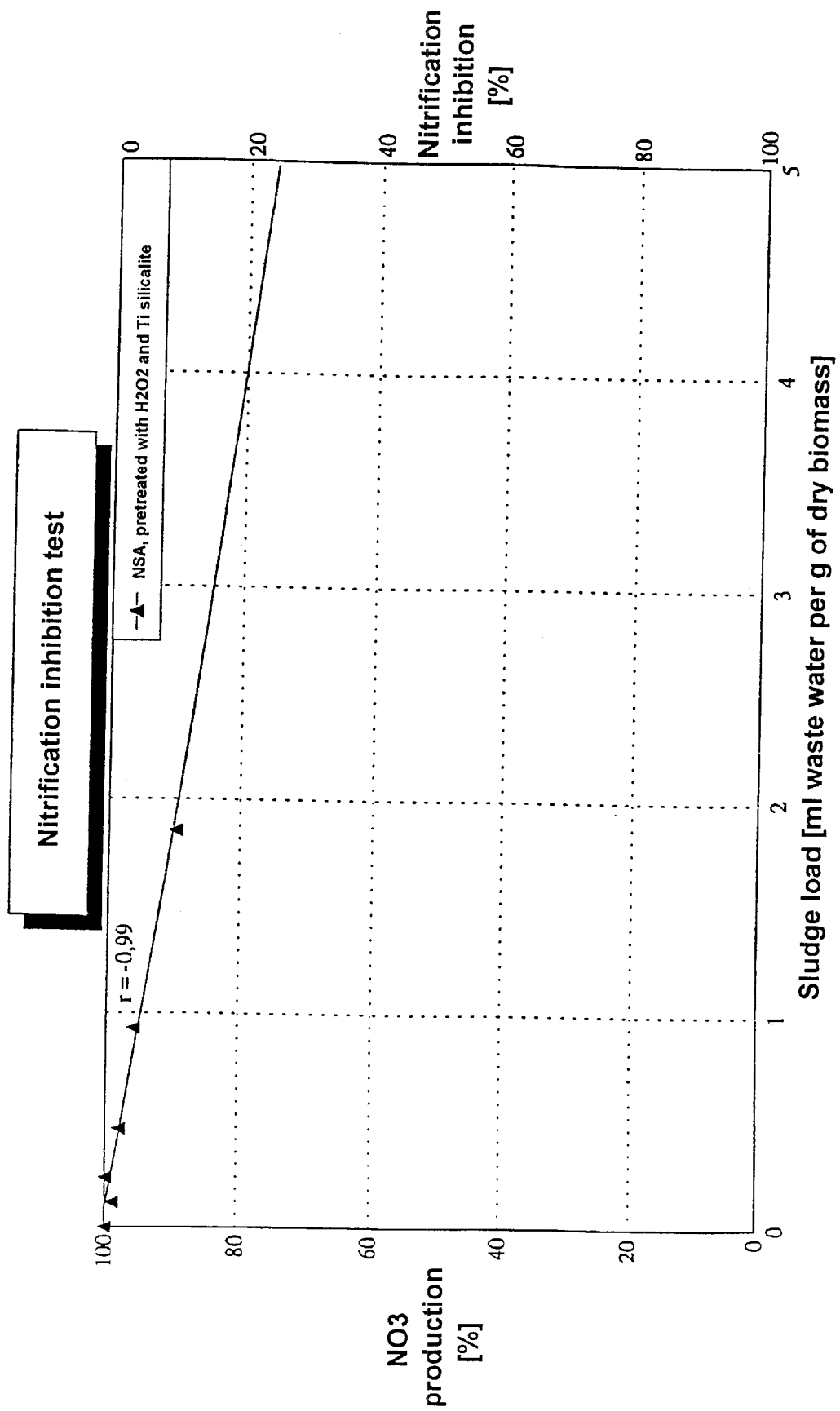
FIG. 5 is a graph showing nitrification inhibition test with waste water pretreated with hydrogen peroxide and titanium silicalite.

The results for eliminating nitrification inhibition are shown graphically in FIGS. 3, 4 and 5.

Further variations and modifications of the foregoing will be apparent to those skilled in the art and are intended to be encompassed by the claims appended hereto.

German application 199 25 534.2 is relied on and incorporated herein by reference.

What is claimed is:

1. A process for treating waste waters, comprising:
   contacting waste water with a hydroxyl radical producer in the presence of a crystalline titanium-containing silicate with regular micropores or mesopores as a catalyst.

2. The process according to claim 1, wherein said titanium-containing silicate is a member selected group consisting of titanium silicalite TS1, titanium silicalite TS2, titanium-containing ZSM5, titanium-containing DAY, titanium-containing beta-zeolite and mixtures thereof.

3. The process according to claim 1, wherein
   said hydroxyl producer is hydrogen peroxide.

4. The process according to claim 1, wherein
   said titanium-containing silicate is a crystalline silicate with the formula $(SiO_2)_{1-x}(TiO_2)_x$.

5. The process according to claim 1, wherein
   said waste water contains at least one of oxidizable organic and inorganic compounds.

6. The process according to claim 1, wherein
   said titanium-containing silicate is present in powdered form.

7. The process according to claim 6, wherein
   said titanium-containing silicate is present in the amount of 0.05 to 100 g/l of the waste water.

8. The process according to claim 7, wherein
   said amount is 0.5 to 10 g/l.

9. A process for treating waste water with a hydroxyl producer in the presence of a titanium-containing silicate as a catalyst at a pH of 2 to 9 and a temperature between the freezing point of the water and the boiling point of the water.

10. The process according to claim 9, wherein
    at least one titanium-containing metal silicate selected from the group consisting of titanium silicalite TS1, titanium silicalite TS2, titanium-containing ZSM5, titanium-containing DAY, and titanium-containing beta-zeolite is used as catalyst.

11. The process according to claim 9, wherein
    said titanium-containing silicate is in the form of moulded granules, extrudates or beads.

12. The process according to claim 11, wherein
    said silicate is in the form of a moulded cylinder with a silica sol binder.

* * * * *